(12) United States Patent
Jung et al.

(10) Patent No.: US 12,166,860 B2
(45) Date of Patent: Dec. 10, 2024

(54) METHOD FOR FORMING BLUETOOTH NETWORK PERFORMING COMMUNICATION BASED ON POST-QUANTUM CRYPTOGRAPHY AT APPLICATION LEVEL AND OPERATING BLUETOOTH NETWORK OPERATING SYSTEM PERFORMING SAME

(71) Applicant: NORMA Inc., Seoul (KR)

(72) Inventors: Hyunchul Jung, Seoul (KR); Chang Nyoung Song, Seoul (KR)

(73) Assignee: NORMA Inc., Seoul (KR)

( * ) Notice: Subject to any disclaimer, the term of this patent is extended or adjusted under 35 U.S.C. 154(b) by 183 days.

(21) Appl. No.: 18/080,698

(22) Filed: Dec. 13, 2022

(65) Prior Publication Data

US 2024/0080183 A1    Mar. 7, 2024

(30) Foreign Application Priority Data

Sep. 5, 2022   (KR) ........................ 10-2022-0112404

(51) Int. Cl.
*H04L 9/08*       (2006.01)
*H04L 9/30*       (2006.01)
(Continued)

(52) U.S. Cl.
CPC .......... *H04L 9/0825* (2013.01); *H04L 9/0822* (2013.01); *H04L 9/30* (2013.01);
(Continued)

(58) Field of Classification Search
CPC ....... H04L 9/0825; H04L 9/0822; H04L 9/30; H04L 9/3236; H04L 2209/80;
(Continued)

(56) References Cited

U.S. PATENT DOCUMENTS

2013/0080768 A1*   3/2013   Lagerway .............. H04L 9/321
                                                        713/176
2022/0038269 A1*   2/2022   Nix ..................... H04L 63/061

FOREIGN PATENT DOCUMENTS

CN         112152817 A     12/2020
KR    1020220012851 A      2/2022

OTHER PUBLICATIONS

Yu-Jin Yang et al., Proposal of Bluetooth model with Post-Quantum Cryptography, Thesis at the Fall Conference of the Korea Information Processing Society, Nov. 4, 2021.

* cited by examiner

*Primary Examiner* — Huan V Doan
(74) *Attorney, Agent, or Firm* — Nicholas Park

(57) ABSTRACT

The present inventive concept relates to a method for forming a Bluetooth network performing communication based on post-quantum cryptography at an application level and a Bluetooth network operating system that performs the same. A method for forming a Bluetooth network performed by a master device to perform Bluetooth communication with a slave device, according to an embodiment of the present invention, comprises the steps of: completing pairing with the slave device; receiving a certificate and an authentication message from the slave device; authenticating the slave device by using the certificate and the authentication message; generating a public key and a private key; generating a symmetric key by using the public key and the private key; and performing Bluetooth network communication by using the symmetric key.

6 Claims, 10 Drawing Sheets

(51) Int. Cl.
*H04L 9/32* (2006.01)
*H04W 76/14* (2018.01)

(52) U.S. Cl.
CPC ........... *H04L 9/3236* (2013.01); *H04W 76/14* (2018.02); *H04L 2209/80* (2013.01)

(58) Field of Classification Search
CPC ... H04L 9/0844; H04L 9/3093; H04L 9/3247; H04L 9/3263; H04L 2209/805; H04W 76/14; H04W 12/0471; H04W 12/50; H04W 4/80; H04W 84/20
See application file for complete search history.

METHOD FOR FORMING BLUETOOTH NETWORK PERFORMING COMMUNICATION BASED ON POST-QUANTUM CRYPTOGRAPHY AT APPLICATION LEVEL AND OPERATING BLUETOOTH NETWORK OPERATING SYSTEM PERFORMING SAME

CROSS-REFERENCE TO RELATED APPLICATION

This application claims priority to and the benefit of Korean Patent Application No. 10-2022-0112404, filed on Sep. 5, 2022, the disclosure of which is incorporated herein by reference in its entirety.

BACKGROUND

Technical Field

The present invention relates to a method for forming a Bluetooth network performing communication based on post-quantum cryptography at an application level and a Bluetooth network operating system performing the same.

Related Art

Bluetooth is a technology standard for wirelessly connecting portable devices such as portable PCs or mobile phones within a narrow range. Bluetooth supports various digital devices to transmit and receive voice and data without a physical cable by using a radio frequency of an industrial scientific medical (ISM) band of 245 MHZ, for example. For example, a Bluetooth communication module is embedded in a mobile communication terminal and a laptop computer to support wireless communication. Because of this convenience, Bluetooth is used in smartphones, desktops, FAXs, keyboards, or joysticks, as well as almost all digital devices.

Meanwhile, with the development of quantum computers, the security of an encryption algorithm used in an existing cryptosystem has been weakened, and accordingly, a need for post-quantum cryptography, which is an encryption algorithm in which security is maintained even by a quantum computer, has emerged, and a virtual private network also needs to be applied by post-quantum cryptography in which security is maintained even by a quantum computer.

SUMMARY

Technical Problem

An object of the present invention is to provide a method for forming a Bluetooth network and a Bluetooth network operating system for performing the same, which perform communication using a post-quantum cryptography at an application level after pairing between a master device and a slave device is completed.

Technical Solution

A method for forming a Bluetooth network performed by a master device to perform Bluetooth communication with a slave device, according to an embodiment of the present invention, comprises the steps of: completing pairing with the slave device; receiving a certificate and an authentication message from the slave device; authenticating the slave device by using the certificate and the authentication message; generating a public key and a private key; generating a symmetric key by using the public key and the private key; and performing Bluetooth network communication by using the symmetric key.

In an embodiment, the step of authenticating the slave device by using the certificate and the authentication message may include acquiring a signature value, a first hash value, and a slave key from the certificate, calculating a first matrix based on the signature value and the slave key, acquiring upper N (N is a natural number) coefficients of a polynomial ring corresponding to the first matrix as first bits, and authenticating the slave device based on the first bits.

In an embodiment, the step of authenticating the slave device based on the first bit may include obtaining a second hash value for the authentication message with the first bit, determining whether the second hash value is equal to the first hash value, and determining that the authentication of the slave device is successful when the second hash value is equal to the first hash value.

In an embodiment, the step of generating the public key and the private key may include: generating a random number by using a random number generator; generating a seed by substituting the random number into a hash function; generating a random polynomial ring by using the seed; defining the key matrix corresponding to the random polynomial ring; sampling a first key vector corresponding to a lattice and a second key vector having a first distance from the first key vector; and generating the public key and the private key by using the key matrix, the first key vector, and the second key vector.

In an embodiment, the step of generating the symmetric key using the public key and the private key may include receiving a key capsule from the slave device, extracting a key message by opening the key capsule using the private key, generating a release random value by hashing the key message, generating a verification capsule by capsuling the public key with the key message and the release random value, and generating the symmetric key by verifying the verification capsule.

In an embodiment, the method may further include: generating the symmetric key by verifying the verification capsule; determining whether the verification capsule is the same as the key capsule; when the verification capsule is the same as the key capsule, generating a prekey through the key message and a hash of the public key; and generating the symmetric key through the key capsule and a hash of the prekey.

A method for forming a Bluetooth network performed by a slave device to form a Bluetooth network with a master device according to an embodiment of the present disclosure may include completing pairing with the master device, performing a signature using an authentication message, transmitting a certificate including the signature and the authentication message to the master device, generating a key capsule using a public key received from the master device, generating a symmetric key using the key capsule, and performing Bluetooth network communication using the symmetric key.

In an embodiment, the step of performing the signature using the authentication message may include obtaining a second bit based on a slave key included in the authentication message, obtaining a second hash value for the second bit and the authentication message, and generating a signature value using the second hash value and the first key vector.

In an embodiment, the step of obtaining the second bit may include obtaining a signature random number by using a random number generator, calculating a second matrix by multiplying the key matrix by the signature random number, and obtaining upper N (N is a natural number) coefficients of a polynomial ring corresponding to the second matrix as the second bit.

In an embodiment, the step of generating the key capsule using the public key received from the master device may include generating a key message using a random number generator, generating a capsule random value through a hash for the key message, and generating the key capsule by capsuling the key message and the capsule random value using the public key.

In an embodiment, the step of generating the symmetric key using the key capsule may include generating a prekey by hashing the key message and the public key, and generating the symmetric key by hashing the prekey and the key capsule.

DETAILED DESCRIPTION

Figure 1:
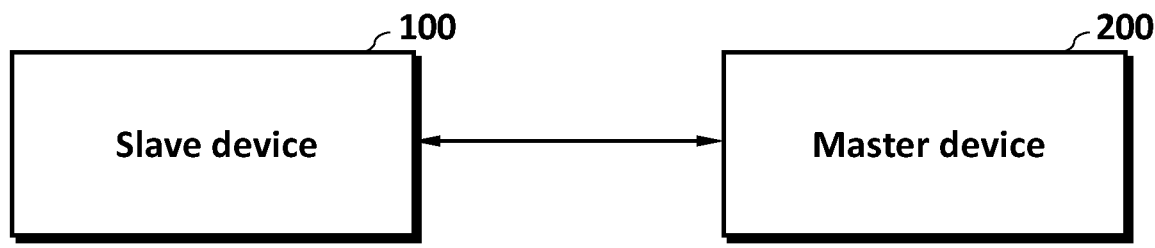
FIG. 1 is a block diagram illustrating a Bluetooth network operating system according to an example embodiment.

Hereinafter, exemplary embodiments of the present disclosure will be described in detail with reference to the accompanying drawings. Advantages and features of the present disclosure and methods of achieving them will become apparent with reference to embodiments described in detail below together with the accompanying drawings. However, the technical spirit of the present invention is not limited to the following embodiments, but may be implemented in various different forms, and the following embodiments are provided to complete the technical spirit of the present invention and to completely inform a person having ordinary skill in the art to which the present invention belongs of the scope of the present invention, and the technical spirit of the present invention is only defined by the scope of Claims.

In adding reference numerals to elements in each drawing, it should be noted that the same elements will be designated by the same reference numerals, if possible, even though they are shown in different drawings. In addition, in describing the present invention, when it is determined that a detailed description of related known configurations or functions may obscure the gist of the present invention, the detailed description thereof will be omitted.

Unless otherwise defined, all terms (including technical and scientific terms) used herein have the same meaning as commonly understood by one of ordinary skill in the art to which the inventive concept belongs. In addition, terms defined in commonly used dictionaries are not interpreted ideally or excessively unless they are clearly specifically defined. The terminology used herein is for the purpose of describing embodiments and is not intended to be limiting of the present invention. In the specification, a singular form includes a plural form unless specifically mentioned in the text.

In addition, in describing components of the present disclosure, terms such as first, second, A, B, (a), (b), and the like may be used. The term is used only to distinguish a component from another component, and the nature, sequence, or order of the corresponding component is not limited by the term. When it is described that a component is "linked", "coupled", or "connected" to another component, the component may be directly connected or connected to the other component, but it should be understood that another component may be "linked", "coupled", or "connected" between the components.

It will be further understood that the terms "comprises" and/or "comprising" used in the present invention do not preclude the presence or addition of one or more other components, steps, operations and/or elements, as mentioned.

Components included in any one embodiment and components including a common function may be described using the same name in another embodiment. Unless stated otherwise, the description described in any one embodiment may be applied to other embodiments, and the detailed description may be omitted within a redundant range or a range that can be obviously understood by a person having ordinary skill in the art.

Hereinafter, some embodiments of the present invention will be described in detail with reference to the accompanying drawings.

Hereinafter, the present invention will be described in detail with reference to preferred embodiments of the present invention and the accompanying drawings.

FIG. 1 is a block diagram illustrating a Bluetooth network operating system according to an example embodiment;

Referring to FIG. 1, the Bluetooth network operating system 10 may include a slave device 100 and a master device 200. In an embodiment, the slave device 100 and the master device 200 may be devices that communicate with each other through a Bluetooth network, and may include various wireless communication devices such as a cellular phone, a smart phone, a laptop, a personal computer (PC), a navigation, a personal communication system (PCS), a global system for mobile communications (GSM), a personal digital cellular (PDC), a personal handyphone system (PHS), a personal digital assistant (PDA), an international mobile telecommunication (IMT)-2000, a code division multiple access (CDMA)-2000, a W-code division multiple access (W-CDMA), a wireless broadband Internet (Wibro), a smart pad, a tablet PC, a wireless earphone, a wireless speaker, a keyboard, a mouse, a display device, and the like.

The master device 200 may perform various communications with the slave device 100 by connecting the slave device 100 in the Bluetooth network. In an example, the master device 200 may transmit a control signal to the paired slave device 100 through the Bluetooth network, and the slave device 100 may perform various operations based on the control signal. In another example, the slave device 100 may transmit the data collected by the slave device 100 to the paired master device 200 through the Bluetooth network.

In an embodiment, the slave device 100 may receive at least one key generated based on a lattice from the master device 200 and may perform various operations for the slave device 100 and the master device 200 to form a Bluetooth network by using the at least one key.

In an embodiment, the master device 200 may authenticate the slave device 100 by using the signature received from the slave device 100 and the certificate including the slave key. Also, in an embodiment, the master device 200 may verify the slave device 100 by using the key capsule received from the slave device 100 and may generate the symmetric key.

In this specification, the operation of the Bluetooth network operating system 10 and the components included therein may mean an operation performed by a processor included in each component based on a computer program including at least one instruction stored in a storage device included in each component, and the storage device may include a non-volatile memory, a volatile memory, a flash memory, a hard disk drive (HDD), a solid state drive (SSD), or the like. The processor may include at least one of a Central Processing Unit (CPU), a Graphic Processing Unit (GPU), a Neural Processing Unit (NPU), a RAM, a ROM, a system bus, and an application processor.

Figure 2:
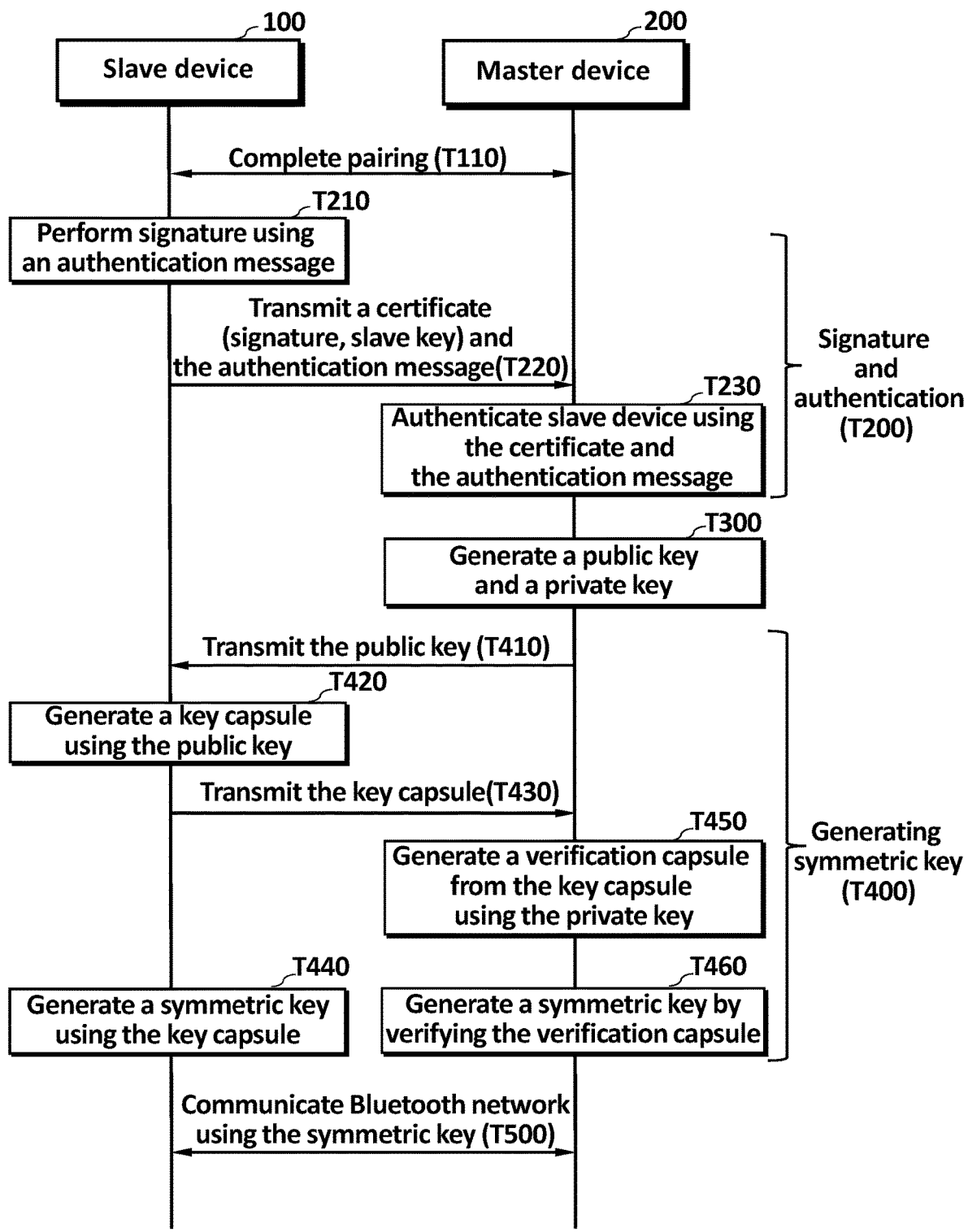
FIG. 2 is a flowchart illustrating a method of operating a Bluetooth network operating system according to an example embodiment.

FIG. 2 is a flowchart illustrating a method of operating a Bluetooth network operating system according to an example embodiment.

Referring to FIG. 2, the master device 200 may discover the slave device 100 by scanning a Bluetooth device in a Bluetooth network and may complete the connection with the slave device 100 through pairing with the slave device 100 T110.

After the connection is completed, the master device 200 and the slave device 100 may perform an encryption process for data transmission using an application program or an application. In an embodiment, the master device 200 and the slave device 100 may perform secure communication through the signature and authentication T200, the key generation T300, and the symmetric key generation T400 T500, and a post-quantum cryptography in which security is not threatened despite quantum computing may apply to at least one of the signature and authentication T200, the key generation T300, and the symmetric key generation T400.

In the signature and authentication step T200, the slave device 100 may perform a signature using an authentication message T210. In an embodiment, the slave device 100 may include the signature in the certificate issued by the certificate authority. Also, the slave device 100 may generate a slave key by a method similar to a method of generating a public key to be described later in FIG. 3 and may include the generated slave key in the certificate. Although an example of performing authentication on the slave device 100 by using a signature and a slave key included in a certificate is illustrated in the present disclosure, in another embodiment, the slave device 100 may perform authentication by using an embedded signature and a slave key without a certificate. The signature step T210 will be described in detail later with reference to FIG. 4.

The slave device 100 may transmit a certificate including the signature and the slave key and an authentication message used to perform the signature to the master device 200 T220. The master device 200 may authenticate the slave device 100 by using the certificate and the authentication message T230. A detailed description of the authentication step T230 will be given later in FIG. 5.

When the authentication of the slave device 100 is successfully completed, the master device 200 may generate a public key and a private key using post-quantum cryptography T300, and a method of generating a key will be described in detail with reference to FIG. 3.

After the key is generated, in the symmetric key generation step T400, the master device 200 may transmit the generated public key T410 to the slave device 100 that has succeeded in authentication T410. The slave device 100 may generate a key capsule using the received public key T420. In the present specification, the capsuling refers to an operation of concealing information that does not need to be exposed to the outside by enclosing the information like a capsule by generating a data path that can be accessed only by a subject having a public key by using the public key, and the opening refers to an operation of confirming the capsuled information by using the public key or a private key corresponding to the public key. The slave device 100 may generate a key capsule by capsuling a key message corresponding to a random value or the like by using a public key, which will be described in detail later with reference to FIG. 6.

The slave device 100 may transmit the generated key capsule to the master device 200 T430 and generate a symmetric key by using the generated key capsule T440. Also, the master device 200 may generate a verification capsule from the key capsule by using a private key corresponding to the public key T450. The master device 200 may generate the symmetric key by verifying the verification capsule generated from the key capsule T460. After the key exchange is completed, the master device 200 and the slave device 100 may perform communication using the Bluetooth network by using the symmetric key T500.

According to the inventive concept, by performing signature and authentication using a public key and a private key generated based on a lattice, even when an attacker attacks a key exchange during a key exchange process between the slave device 100 and the master device 200, information about the key may not be leaked.

Further, according to the technical spirit of the present disclosure, by generating a symmetric key by transmitting and receiving only a key capsule with increased security by re-capsuling the random value, an exchange of the symmetric key may be performed only by transmitting and receiving the key capsule without transmitting and receiving the symmetric key itself. As a result, even though the key capsule is exposed, information on the symmetric key is not exposed and security may be increased as the key exchange is finished.

According to an exemplary embodiment of the present disclosure, by performing the slave key using the lattice-based algorithm between the slave device 100 and the master device 200, the public key in the certificate may not be exposed to the attacker even when the attacker captures the certificate in the process of transmitting the certificate between the slave device 100 and the master device 200, and the signature of the master device 200 and the authentication of the master device 200 may be smoothly performed even when the slave key using the lattice-based algorithm is used by utilizing the unique signature algorithm and the authentication algorithm.

Figure 3:
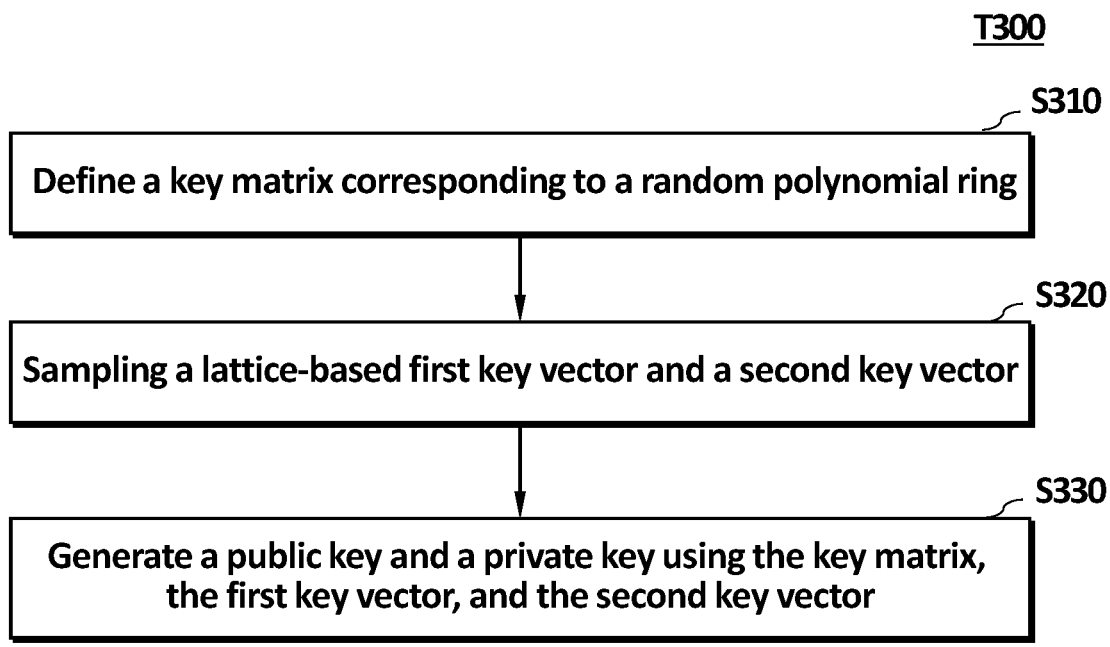
FIG. 3 is a flowchart illustrating a method of generating a post-quantum key according to an example embodiment.

FIG. 3 is a flowchart illustrating a post-quantum key generation algorithm according to an example embodiment. In detail, FIG. 3 is a diagram illustrating the key generation method T300 of FIG. 2 in detail.

Referring to FIG. 3, the master device 200 may define a key matrix corresponding to the random polynomial ring S310. The polynomial ring may refer to a ring viewed from an abstract algebraic point of view with respect to a polynomial having a real number and a complex number as coefficients and an unknown number, and the random polynomial ring may refer to a polynomial ring of which coefficients are randomly determined. In addition, the key matrix corresponding to this may mean that the coefficient of the random polynomial ring is represented as a matrix.

The master device 200 may sample the first key vector and the second key vector by using a lattice-based algorithm S320. The lattice-based algorithm refers to an encryption algorithm based on mathematical problems on a lattice called a lattice problem, and the lattice problem includes a Shortest Vector Problem (SVP), a Shortest Independent Vectors Problem (SIVP), and a Closest Vector Problem (CVP). The security of the lattice-based algorithm is based on the fact that it is difficult to solve the above-described lattice problem, and since it is difficult to find a lattice point closest to an arbitrary position in a lattice of hundreds of dimensions, if a key is matched to the corresponding lattice point, it is difficult to find a private key corresponding to the position through quantum computing, and thus the lattice-based algorithm may be an alternative. In one example, if any location on the lattice corresponds to a public key and a particular location close to the public key corresponds to a private key, the private key can be hidden at the intersection of the multidimensional lattice, the number of possibilities of shortest vectors for the private key is infinite, and the process of traversing the range of possibilities and the number of permutations in the quantum computer cannot take advantage of the advantages of the quantum computer over the existing computer due to its complex nature. That is, the encryption key may be determined only when the attacker knows his or her own path through the lattice, that is, the attacker has no way to calculate the path, so it may be said that it is theoretically impossible for the attacker to calculate the private key. In an embodiment, a Gaussian distribution method and a dejection sampling method may be used to sample key vectors among a plurality of vectors generated using the lattice-based algorithm.

The master device 200 may generate a public key and a private key using the generated key matrix, the first key vector, and the second key vector S330.

According to the technical idea of the disclosure, a hacking attempt by quantum computing may be prevented by utilizing a lattice-based algorithm in a process of generating a key for a Bluetooth network, and accordingly, security of the Bluetooth network may be increased.

In the key matrix definition step S310 according to an embodiment, the master device 200 may generate a key random number using a random number generator S311. The master device 200 may generate a seed by substituting the key random number into a hash function S312 and may generate a random polynomial ring using the seed S313. Also, the master device 200 may define a key matrix corresponding to the random polynomial ring S314.

According to an exemplary embodiment of the present disclosure, when defining a key matrix, a random number generator, a hash function, and a random polynomial ring are used to maximize randomness of the key matrix, and as a result, randomness of a key may be maximized.

In the public key and private key generation step S330 according to an embodiment, the master device 200 may define a key value by using the key matrix, the first key vector, and the second key vector S331. In one example, the key value k for the key matrix A, the first key vector v1, and the second key vector v2 may be defined as Equation 1 below.

$$k = A \cdot v1 + v2 \qquad \text{Equation 1}$$

The master device 200 may generate a key matrix and a key value as a public key S332, and may generate a key matrix, a key value, a first key vector, and a second key vector as a private key S333. In one example, the public key pk and the private key sk may be generated as shown in Equation 2 below.

$$pk = (A, k), sk = (A, k, v1, v2) \qquad \text{Equation 2}$$

The master device 200 according to an embodiment of the disclosure may generate a public key and a private key using a key value defined using a lattice-based algorithm, may increase security of the public key by including a key vector in the private key, and may fully decode data using the private key.

Although FIG. 3 illustrates a process in which the master device 200 generates a public key and a private key, it should be understood that the same method may be applied to a process in which the slave device 200 generates a slave key as described above.

Figure 4:
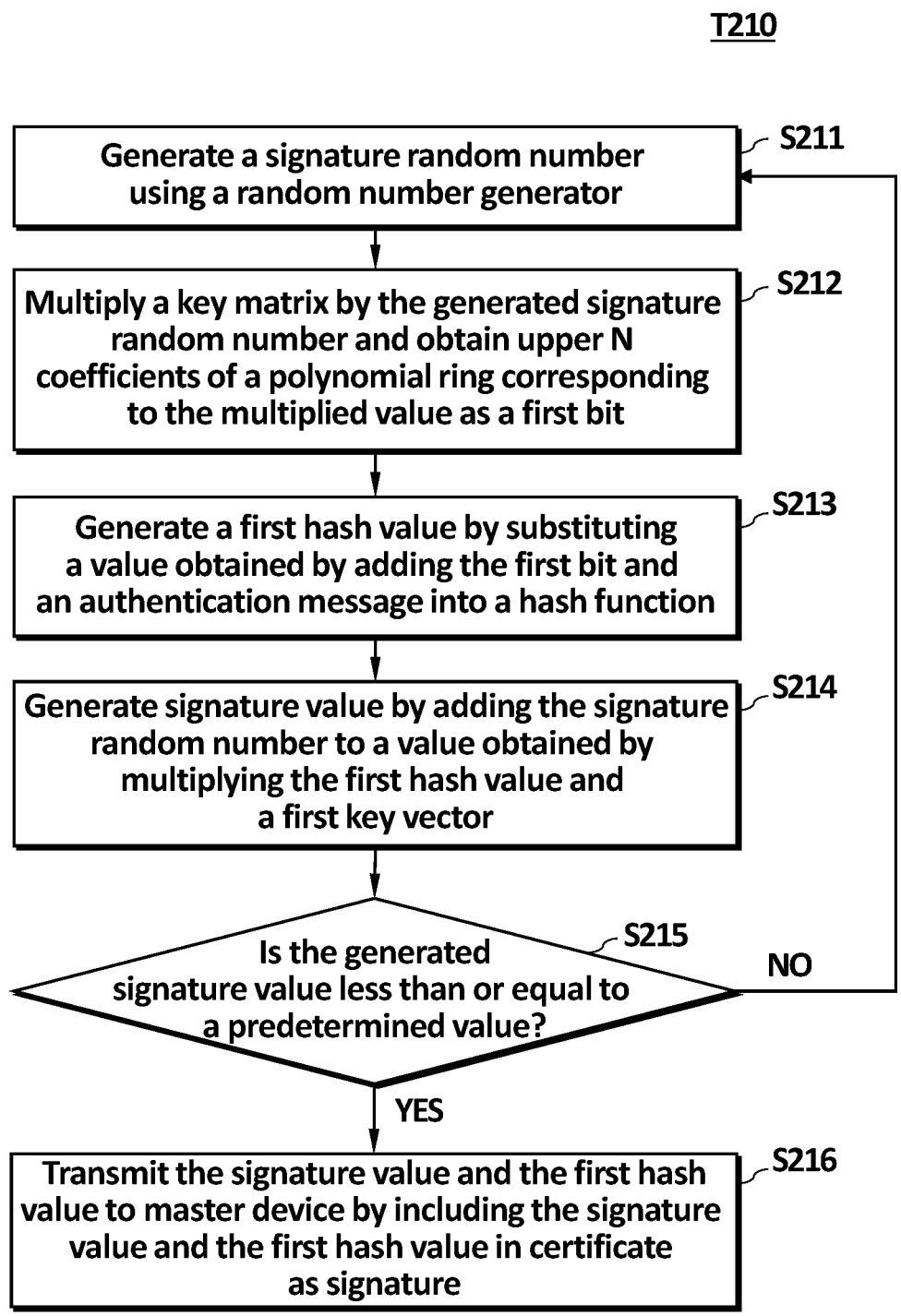
FIG. 4 is a flowchart illustrating a post-quantum signature method according to an example embodiment.

FIG. 4 is a flowchart illustrating a post-quantum signature method according to an example embodiment. In detail, FIG. 4 illustrates the signature step T210 of FIG. 2 in detail.

Referring to FIG. 4, the slave device 100 may generate a signature random number using a random number generator S211. The slave device 100 may calculate a first matrix by multiplying the key matrix included in the public key by the generated signature random number and may obtain upper N (N is a natural number) coefficients of the polynomial ring corresponding to the calculated first matrix as first bits S212. In an example, the slave device 100 may obtain the first bit by listing the upper N coefficients of the polynomial ring. According to an exemplary embodiment of the present disclosure, the slave device 100 may determine the hash value by using the N upper coefficients in the polynomial ring, thereby enabling accurate authentication in the authentication procedure.

The slave device 100 may generate a first hash value by substituting a value obtained by adding the first bit and the authentication message into a hash function S213. In an example, the authentication message may indicate a message having a meaning arbitrarily determined by the slave device 100, and an action of adding the first bit and the authentication message may mean an action of adding the first bit to a bit value corresponding to the authentication message.

The slave device 100 may generate a signature value by adding a signature random number to a value obtained by multiplying the first hash value by the first key vector included in the private key S214. For the first hash value h1, the first key vector v1, and the signature random number rn, the signature value sv may be determined according to the following Equation 3.

$$sv = h1 \cdot v1 + rn \qquad \text{Equation 3}$$

The slave device 100 may check whether the generated signature value is equal to or less than a predetermined value S215. When the generated signature value is less than or equal to the predetermined value, the slave device 100 may include the signature value and the first hash value in the certificate as the signature and transmit the certificate to the master device 200 S216, and when the generated signature value is not less than or equal to the predetermined value, the slave device 100 may generate a new signature random number and perform the operation of generating a signature value again.

According to an exemplary embodiment of the present disclosure, the slave device 100 may secure a signature by determining the signature value using a lattice-based key vector, a hash value, and a signature random number, and may secure high security by adopting the signature value only when the signature value is equal to or less than a predetermined value.

Figure 5:
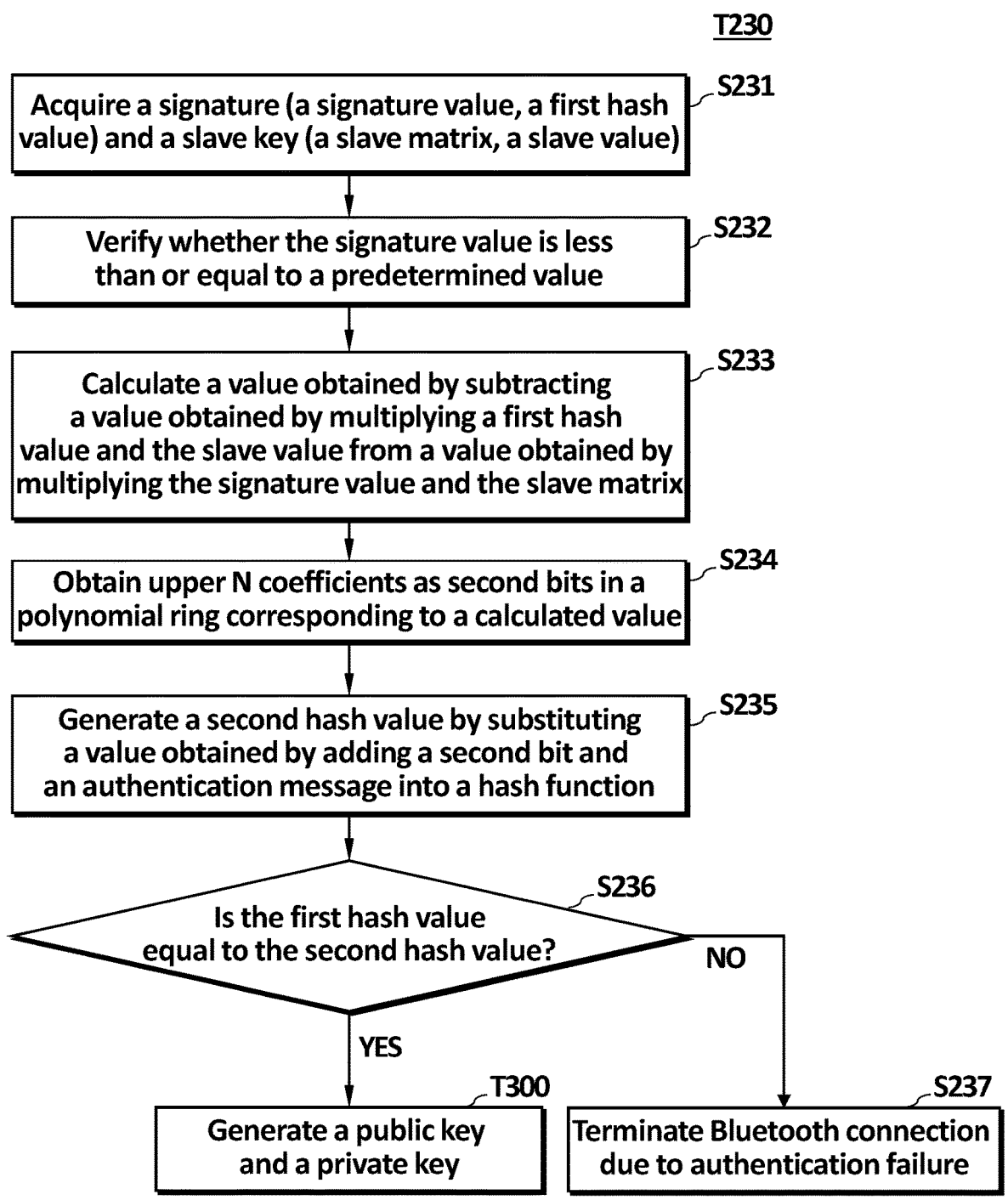
FIG. 5 is a flowchart illustrating a post-quantum authentication method according to an embodiment of the present invention.

FIG. 5 is a flowchart illustrating a post-quantum authentication method according to an embodiment of the present invention. In detail, FIG. 5 illustrates the authentication step T230 of FIG. 2 in detail.

Referring to FIG. 5, the master device 200 may obtain a signature including a signature value and a first hash value and a public key including a key matrix and a key value from a certificate S231. The master device 200 may check whether the signature value is equal to or less than a predetermined value S232. In an embodiment, the predetermined value may be a value previously discussed with the slave device 100, and the master device 200 may primarily determine whether the signature value is altered by determining whether the signature value is equal to or less than the predetermined value.

The master device 200 may calculate a value obtained by subtracting a value obtained by multiplying a value obtained by multiplying the signature value by the key matrix from a value obtained by multiplying the first hash value by the key value. The slave device may calculate the second matrix B with respect to the signature value sv, the key matrix A, the first hash value h1, and the key value k.

$$B = sv \cdot A - h1 \cdot k \quad \text{Equation 4}$$

By Equation 4 and Equation 3, the second matrix B may be calculated as follows.

$$B = rn \cdot A - h1 \cdot v2 \quad \text{Equation 5}$$

The master device 200 may obtain upper N coefficients of the polynomial ring corresponding to the second matrix B as second bits S234. The master device 200 may generate a second hash value by substituting a value obtained by adding the second bit and the authentication message into a hash function S235. In one example, the portion of the second matrix B may not be included in the upper coefficient, and accordingly, hash values for upper bits of the first matrix and the second matrix, which are multiples of the key matrix A, may be equal to each other only when the signature is valid according to the property of the hash function.

Therefore, when the first hash value included in the signature is equal to the second hash value obtained by the calculation S236, the master device 200 may generate a public key and a private key T300, and when the first hash value included in the signature is not equal to the second hash value obtained by the calculation S236, the master device 200 may terminate the Bluetooth connection due to authentication failure S237.

According to an embodiment of the present disclosure, by performing a signature and an authentication procedure by using an upper coefficient of a matrix, an accurate authentication procedure may be performed despite a lattice-based algorithm, and a Bluetooth network that is safe even in quantum computing may be constructed.

Although not shown, in an embodiment, the master device 200 may additionally authenticate whether the certificate is valid through an authentication organization.

Figure 6:
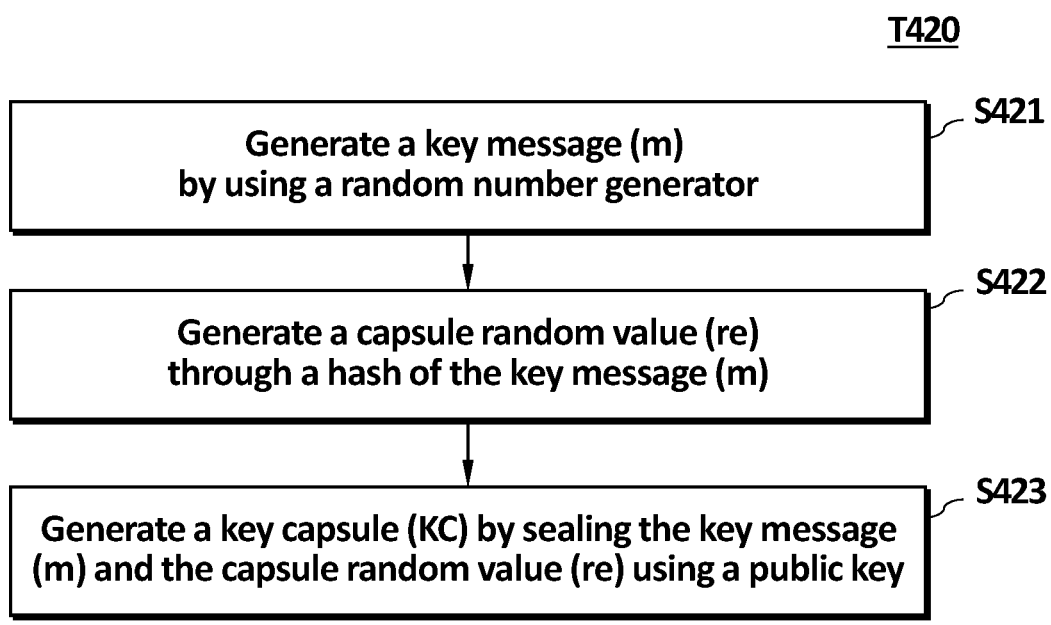
FIG. 6 is a flowchart illustrating a method of exchanging a post-quantum key according to an example embodiment.

FIG. 6 is a flowchart illustrating a Bluetooth network key exchange method according to an embodiment of the present invention. In detail, FIG. 6 illustrates a method T420 of generating a key capsule of the slave device 100 of FIG. 2.

Referring to FIG. 6, the slave device 100 may generate a key message m using a random number generator S421. The random number generator refers to a device for generating a random number or symbol that cannot be theoretically predicted based on entropy, and may include a non-deterministic random bit generator (NRBG) and a deterministic random bit generator (DRBG) according to a noise source to be used. In addition, the key message m is data in which a plurality of bits generated using the random number generator are listed, and may be generated as 256 bit in one example.

The slave device 100 may generate a capsule random value re by hashing the key message m S421. The slave device 100 may generate a key capsule KC by capsuling the key message m and the capsule random value re using the public key S423.

According to an embodiment of the disclosure, the slave device 100 may generate the key message m generated as a random value and the capsule random value re which is a hash value for the key message m and capsule the key message m and the capsule random value re by using the public key once again, thereby maximizing security of the generated key capsule KC, and an operation of verifying the key capsule KC by the master device 200 by using the key message m and the capsule random value re may be accurately performed.

Figure 7:
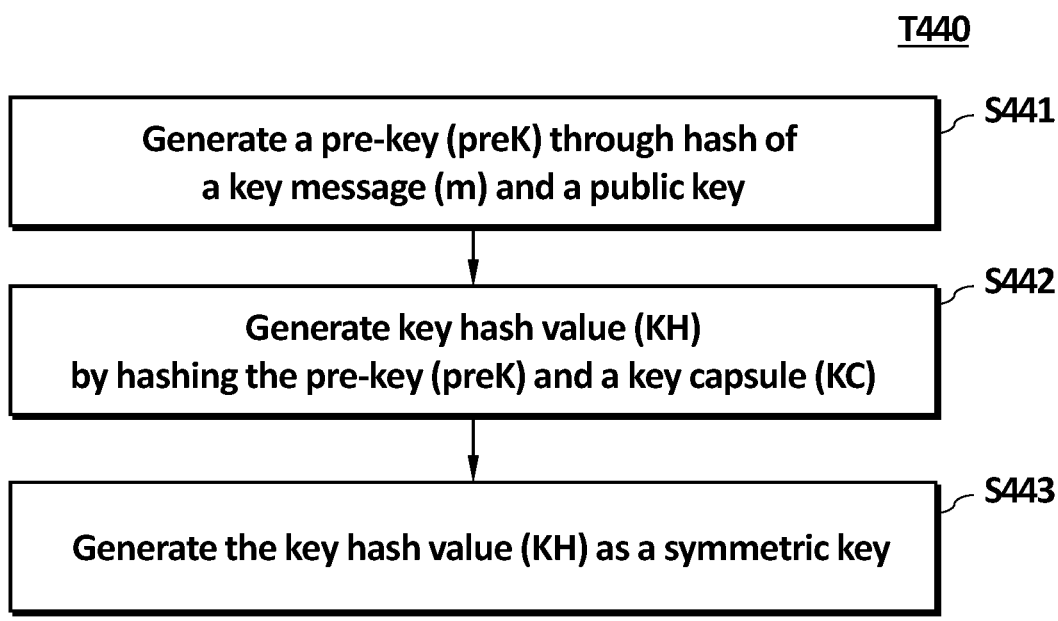
FIG. 7 is a flowchart illustrating a method of exchanging a post-quantum key according to an example embodiment.

FIG. 7 is a flowchart illustrating a Bluetooth network key exchange method according to an embodiment of the present invention. In detail, FIG. 4 illustrates a symmetric key generation method T440 of the slave device 100 of FIG. 2.

Referring to FIG. 7, the slave device 100 may generate a pre-key preK by hashing a key message m generated using a random number generator and a public key S441. The slave device 100 may generate the key hash value KH by hashing the pre-key preK and the key capsule KC again S442. The slave device 100 may use the generated key hash value KH as a symmetric key S443.

According to an exemplary embodiment of the present disclosure, the slave device 100 may generate the pre-key preK by using the key message m and the public key shared with the master device 200, and may generate the key hash value KH, which is the symmetric key, by using the key capsule KC and the pre-key preK shared with the master device 200, so that even when the key capsule KC is exposed to an attacker using quantum computing in the process of generating the same symmetric key as the master device 200, the symmetric key may not be exposed to the attacker because the symmetric key is generated by using the pre-key preK, which is not exposed to the attacker, together, and stability of key exchange may be increased.

Figure 8:
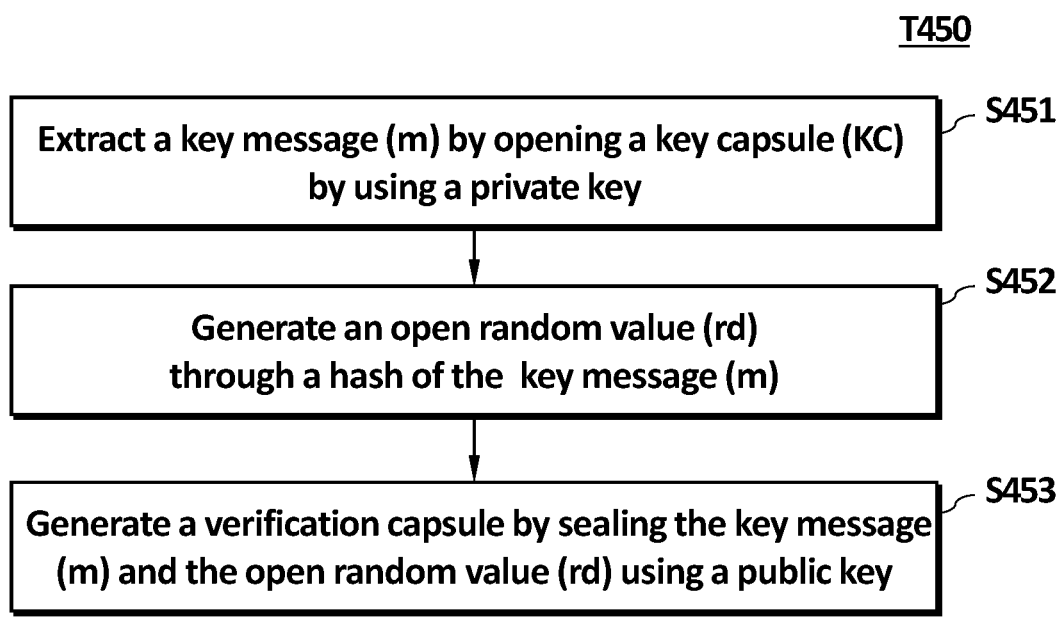
FIG. 8 is a flowchart illustrating a method of exchanging a post-quantum key according to an example embodiment.

FIG. 8 is a flowchart illustrating a Bluetooth network key exchange method according to an embodiment of the present invention. In detail, FIG. 8 illustrates a verification capsule generation method T450 of the master device 200 of FIG. 2.

Referring to FIG. 8, the master device 200 may extract the key message m by opening the key capsule KC using the private key S451. Since the key capsule KC is capsuled by the public key, the key message m may be normally extracted by using the private key corresponding to the public key.

The master device 200 may generate the opening random value rd through the hash for the key message m S452. In an embodiment, since the output is the same when the inputs are the same in the case of the hash function, when data is not modified by an attacker in the process of transmitting the key capsule KC from the slave device 100 to the master device 200, the master device 200 may equally receive the key message m transmitted from the slave device 100, and the opening random value rd according to the same may be the same as the capsule random value re.

The master device 200 may generate a verification capsule by capsuling the key message m and the opening random value rd with the public key S453. In an embodiment, when the data is not modified in the process of transmitting the public key from the master device 200 to the slave device 100, since the public key utilized by the slave device 100 is the same as the public key utilized by the master device 200, the verification capsule capsuled using the public key may be the same as the key capsule KC received from the slave device 100.

Figure 9:
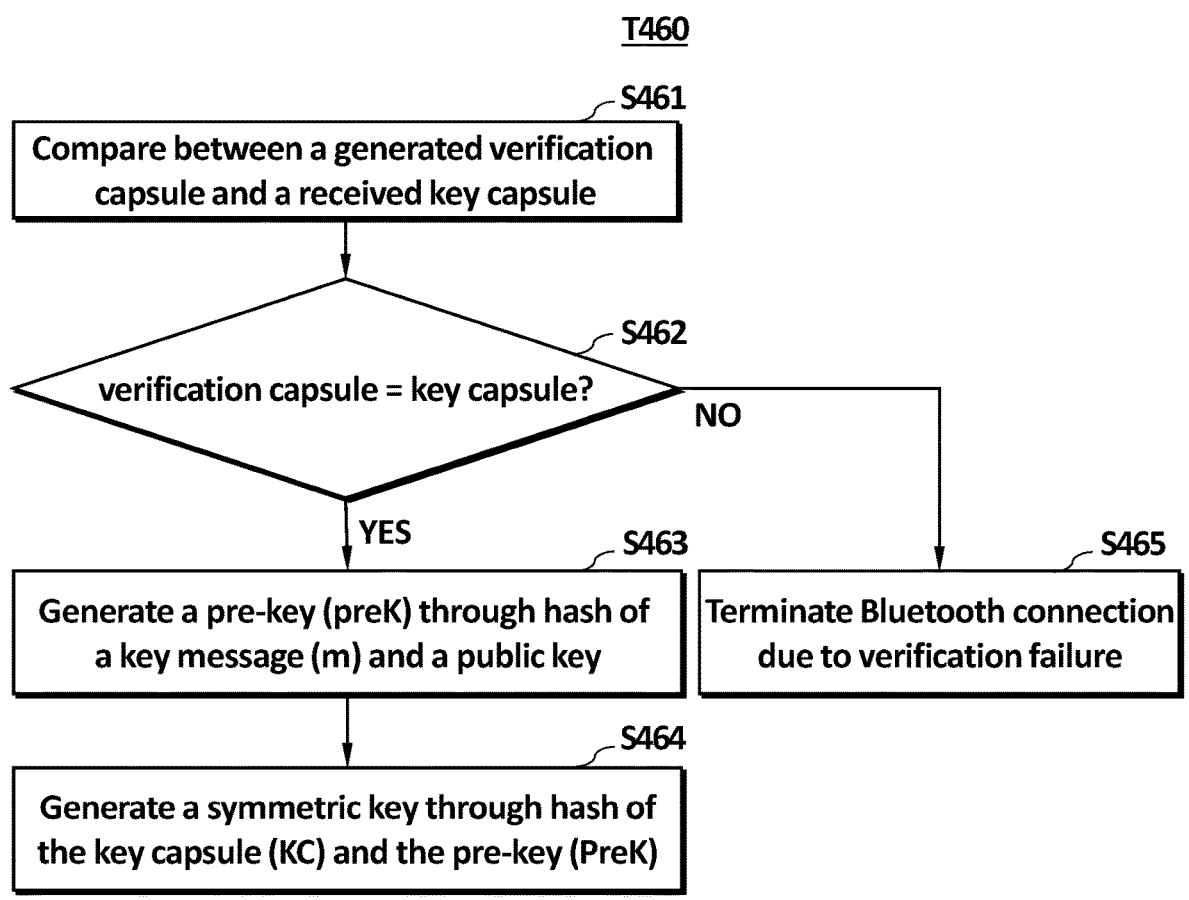
FIG. 9 is a flowchart illustrating a method of exchanging a post-quantum key according to an example embodiment.

FIG. 9 is a flowchart illustrating a Bluetooth network key exchange method according to an embodiment of the present invention. In detail, FIG. 6 illustrates a symmetric key generation method T460 of the master device 200 of FIG. 2.

Referring to FIG. 9, the master device 200 may compare the generated verification capsule with the received key capsule KC S461. As described above, the verification capsule and the key capsule KC may be the same only when the attack of the attacker on the public key and the key capsule is not performed, and when the verification capsule and the key capsule KC are the same, it may be guaranteed that the key capsule KC of the slave device 100 and the key capsule KC of the master device 200 are the same.

According to an exemplary embodiment of the present disclosure, the verification of the key exchange may be performed using the key capsule KC and the verification capsule, and thus, the data deformation attack from the attacker may be detected in advance, and the security of the Bluetooth network may be increased.

Therefore, when the verification capsule and the key capsule KC are the same S462, the master device 200 may generate the pre-key preK through the hash of the key message m and the public key S463, and may generate the symmetric key through the hash of the key capsule KC and the pre-key preK S464, similarly to the method of generating the symmetric key of the slave device described above with reference to FIG. 4, and when the verification capsule and the key capsule KC are not the same, the master device 200 may terminate the Bluetooth connection due to the verification failure S465.

According to an exemplary embodiment of the present disclosure, even when the key capsule KC is exposed to an attacker using quantum computing in the process of generating the same symmetric key as the slave device 100, the symmetric key may not be exposed to the attacker and the stability of key exchange may be increased because the symmetric key is generated by using the pre-key preK that is not exposed to the attacker.

Figure 10:
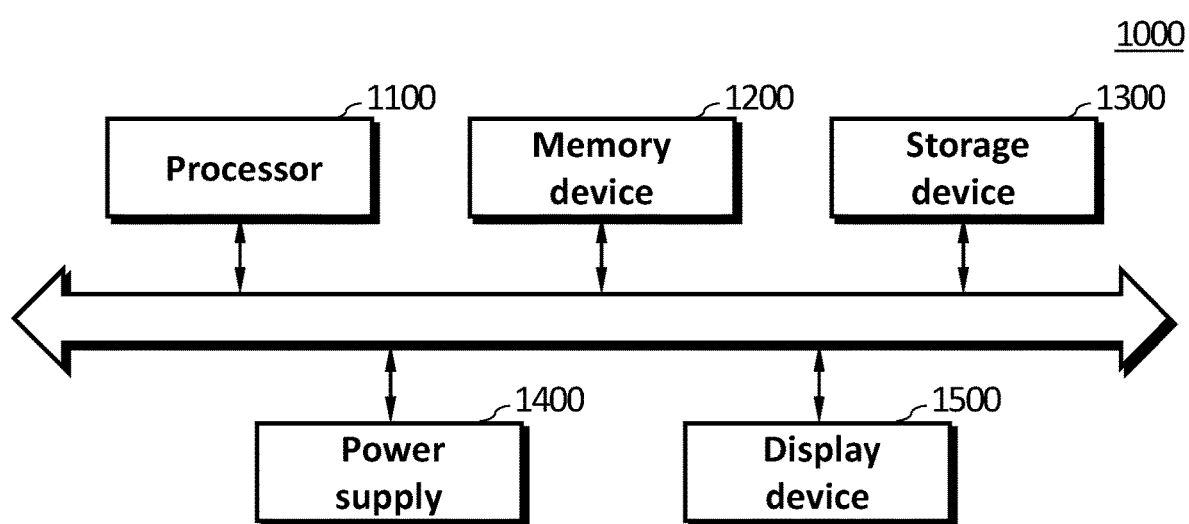
FIG. 10 is a block diagram of a computing system according to an example embodiment.

FIG. 10 is a block diagram of a computing system according to an example embodiment.

Referring to FIG. 10, the computing system 1000 may be one of the slave device 100 and the master device 200, and may include a processor 1100, a memory device 1200, a storage device 1300, a power supply 1400, and a display device 1500. Although not illustrated in FIG. 10, the computing system 1000 may further include ports for communicating with a video card, a sound card, a memory card, a universal serial bus (USB) device, other electronic devices, etc.

As described above, the processor 1100, the memory device 1200, the storage device 1300, the power supply 1400, and the display device 1500 included in the computing system 1000 may configure any one of the master device 200, the slave device 100, and the master device 200 according to embodiments of the inventive concept to perform a Bluetooth network forming method. Specifically, the processor 1100 may perform the method of operating the Bluetooth network operating system 10 described above with reference to FIGS. 1 to 9 by controlling the memory device 1200, the storage device 1300, the power supply 1400, and the display device 1500.

The processor 1100 may perform specific calculations or tasks. According to an embodiment, the processor 1100 may be a micro-processor or a Central Processing Unit (CPU). The processor 1100 may communicate with the memory device 1200, the storage device 1300, and the display device 1500 through a bus 1600 such as an address bus, a control bus, or a data bus. According to an embodiment, the processor 1100 may also be connected to an expansion bus such as a Peripheral Component Interconnect (PCI) bus.

The memory device 1200 may store data necessary for an operation of the computing system 1000. For example, the memory device 1200 may be implemented as a DRAM, a mobile DRAM, an SRAM, a PRAM, an FRAM, an RRAM, and/or an MRAM. The storage device 1300 may include a solid state drive, a hard disk drive, a CD-ROM, etc. The storage device 1300 may store programs, application program data, system data, operating system data, etc., related to the method for forming the Bluetooth network described above with reference to FIGS. 1 to 9.

The display device 1500 may display information about a method for forming a Bluetooth network, which is an output means for performing a notification with respect to a user, to the user, etc. The power supply 1400 may supply an operating voltage required for an operation of the computing system 1000.

According to the technical idea of the present disclosure, by providing a method of performing Bluetooth communication using a post-quantum cryptography at an application level after pairing between a master device and a slave device is completed, post-quantum Bluetooth communication may be provided without changing an initial formation protocol for a Bluetooth network, and accordingly, security of Bluetooth communication may be increased.

Exemplary embodiments have been invented in the drawings and specification as described above. Although embodiments have been described using specific terms in the present specification, they are used only for the purpose of describing the technical spirit of the present invention and are not used to limit the meaning or limit the scope of the present invention described in Claims. Therefore, it will be understood by those of ordinary skill in the art that various modifications and other equivalent embodiments are possible therefrom. Therefore, the true technical protection scope of the present invention should be determined by the technical spirit of the appended claims.

What is claimed is:

1. A method for forming a Bluetooth network performed by a master device which includes a processor to perform Bluetooth communication with a slave device, the method comprising the steps of:
  completing, by the processor, pairing with the slave device;
  receiving, by the processor, certificate and authentication message form the salve device;

authenticating, by the processor, the slave device by using the certificate and the authentication message;

generating, by the processor, a public key and a private key;

generating, by the processor, a symmetric key by using the public key and private key; and performing, by the processor, a Bluetooth network communication by using the symmetric key, wherein the generating the public key and private key comprises the steps of:

generating, by the processor, random number by using a random number generator;

generating, by the processor, a seed by substituting the random number to a hash function;

generating, by the processor, a random polynomial ring by using the seed;

defining, by the processor, a key matrix corresponding to the random polynomial ring;

sampling, by the processor, a first key vector corresponding to a grid and a second key vector having a first distance from the first key vector; and generating, by the processor, the public key and private key by using the key matrix, the first key vector and the second key vector, wherein the generating a symmetric key by using the public and private key comprises the steps of:

receiving, by the processor, key capsule from the salve device;

extracting, by the processor, a key message by opening the key capsule by using the private key;

generating, by the processor, a verification capsule by sealing the key message and the opening random value as the public key; and generating, by the processor, the symmetric key by verifying the verification capsule;

wherein the generating the symmetric key by verifying the verification capsule comprises the steps of:

confirming, by the processor, whether the verification capsule and the key capsule are the same;

generating, by the processor, a prekey through hash for the key message and the public key if the verification capsule and the key capsule are the same; and generating, by the processor, a symmetric key through hash for the key capsule and the pre key.

2. The method for forming a Bluetooth network of claim 1, wherein the authenticating the slave device by using the certificate and the authentication message comprises:

acquiring, by the processor, a signature value, a first hash value, and a slave key from the certificate;

calculating, by the processor, a first matrix based on the signature value and the slave key;

obtaining, by the processor, upper N (N is a natural number) coefficients of a polynomial ring corresponding to the first matrix as first bits; and authenticating, by the processor, the slave device based on the first bits.

3. The method for forming a Bluetooth network of claim 2, wherein the authenticating the slave device based on the first bit comprises:

obtaining, by the processor, the first bit and a second hash value for the authentication message;

determining, by the processor, whether the second hash value is equal to the first hash value; and determining, by the processor, that the authentication of the slave device is successful when the second hash value is equal to the first hash value.

4. A method for forming a Bluetooth network performed by a slave device including a processor to form a Bluetooth network with a master device, the method comprising:

completing, by the processor, pairing with the master device;

performing, by the processor, a signature using an authentication message;

transmitting, by the processor, a certificate including the signature and the authentication message to the master device;

generating, by the processor, a key capsule using a public key received from the master device;

generating, by the processor, a symmetric key using the key capsule; and performing, by the processor, Bluetooth network communication using the symmetric key, wherein the step of generating the key capsule using the public key received from the master device comprises:

generating, by the processor, a key message using a random number generator;

generating, by the processor, a sealing random value through a hash for the key message;

generating, by the processor, the key capsule by sealing the key message and the sealing random value using the public key; and generating, by the processor, the key capsule by sealing the key message and the sealing random value using the public key, wherein the step of generating the symmetric key using the key capsule comprises generating, by the processor, a prekey through a hash for the key message and the public key.

5. The method for forming a Bluetooth network of claim 4, wherein the step of performing the signature using the authentication message comprises:

obtaining, by the processor, a second bit based on a slave key included in the certificate;

obtaining, by the processor, the second bit and a second hash value for the authentication message; and generating, by the processor, a signature value using the second hash value and the slave key.

6. The method for forming a Bluetooth network of claim 5, wherein the acquiring of the second bit comprises:

acquiring, by the processor, a signature random number using a random number generator;

calculating, by the processor, a second matrix by multiplying a key matrix by the signature random number; and acquiring, by the processor, N upper coefficients (N is a natural number) of a polynomial ring corresponding to the second matrix as the second bit.

* * * * *